(No Model.)
2 Sheets—Sheet 1.
B. A. FISKE.
RANGE AND POSITION FINDER.
No. 483,999.
Patented Oct. 11, 1892.
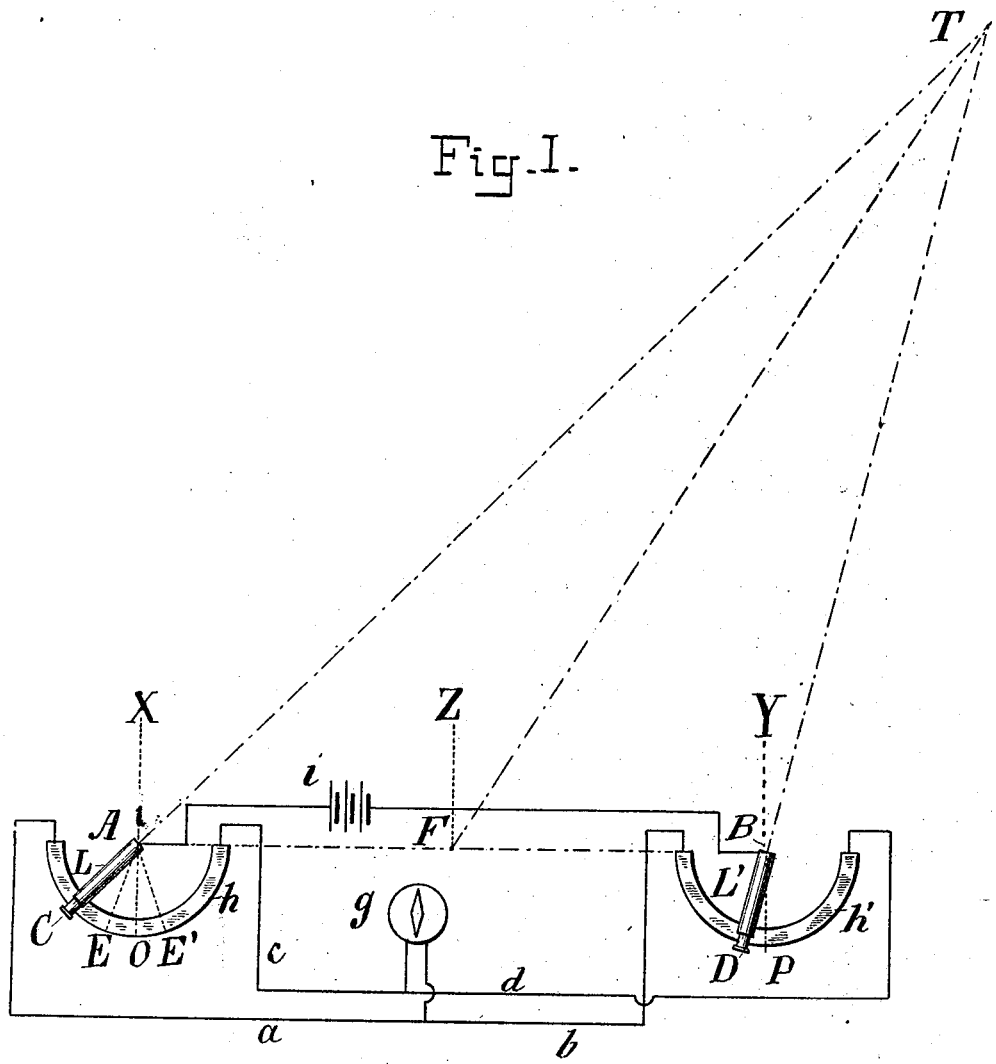
Witnesses
Chas. Hanimann
H. R. Moller
Inventor
Bradley A. Fiske
By his Attorney
Park Benjamin

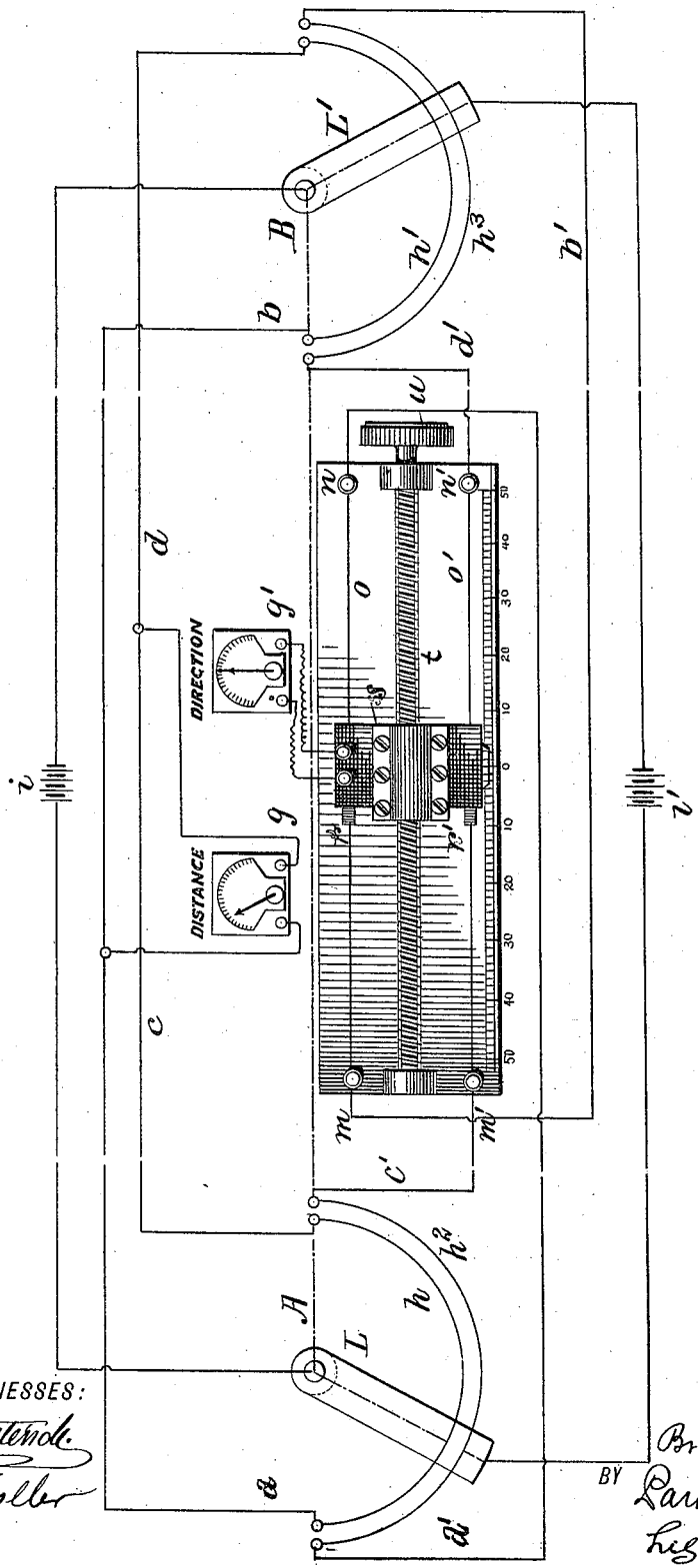

UNITED STATES PATENT OFFICE.

BRADLEY ALLAN FISKE, OF THE UNITED STATES NAVY.

RANGE AND POSITION FINDER.

SPECIFICATION forming part of Letters Patent No. 483,999, dated October 11, 1892.

Application filed February 13, 1892. Serial No. 421,439. (No model.)

*To all whom it may concern:*

Be it known that I, BRADLEY ALLAN FISKE, of the United States Navy, have invented a new and useful Improvement in Position-Finders, of which the following is a specification.

In United States Letters Patent No. 406,829, granted to me on July 9, 1889, and in various other Letters Patent of subsequent date granted to me I have fully described an improved form of range-finder, which has been adopted and put in use in the United States Navy and in other navies of the world.

In my said former Letters Patent I have claimed, "in a range or position finder, in combination with a source of electricity and an indicating device, such as described, two similar bodies of conducting material similarly disposed with reference to a predetermined base-line, alidade-arms establishing and maintaining electrical contact with said bodies, and circuit-connections, as set forth, and including a Wheatstone bridge having adjacent members, as $d$ and $c$ and $a$ and $b$, connected to corresponding ends of said bodies."

In another Letters Patent, No. 406,830, granted to me and bearing the same date as my Letters Patent aforesaid, I have claimed "the improvement in the art of finding the range of a distant object, which consists in first determining a fractional portion of a conducting-body bearing in length a ratio to the angle included between two lines of sight directed upon a distant object, and, second, measuring the electrical resistance of said length."

The instrument embodying the method and combination above noted has come into use and is intended as a range-finder—that is to say, it measures the distance from the observer to a distant object upon which the alidade-arms or telescopes of the instrument are trained.

My present invention relates to the adaptation of that apparatus specifically to use as a position-finder; or, in other words, it consists in a construction and arrangement whereby I impart to said instrument in addition to its capacity as a range-finder the capacity also of a position-finder, so that it will measure not only the distance of the object from the observer or from a given point on the base-line connecting the two observers, but will also show the bearing of the object from said point. The advantage of such an instrument in practice lies principally in the fact that it affords not only the information necessary to give the guns the proper elevation to cause them to throw their projectiles so that the object may be struck, but also imparts the further information of the proper angle of lateral train of said guns. Hence, this information once being obtained, it is simply necessary to transmit it to the guns in order that they may be laid upon the object correctly, and therefore the necessity of any sighting of the guns by persons located at them is obviated. In brief, the instrument makes it needless for the person serving the guns to see the target. They have simply to place the gun at the angle of train and at the elevation which the instrument indicates.

My invention consists in the novel arrangement of circuit connections and indicating devices in combination with the alidade-arms or telescopes and the arcs of conducting material over which said telescopes are moved, in the manner hereinafter more particularly described.

In the accompanying drawings, Figure 1 represents my range-finder, as at present constructed, in the form of an electrical diagram, the parts being substantially similar and arranged in substantially like manner to those already described by me in my prior patents and pending application. Fig. 2 represents the apparatus arranged both as a range-finder and containing my present invention, whereby it becomes adapted to the purposes of a position-finder.

Similar letters of reference indicate like parts.

Referring first to Fig. 1, A B represents any base-line extending between the pivot-points of the two telescopes or alidade-arms L L'. T is the position of the distant object upon which the telescopes L and L' are here shown as trained, the lines of sight being indicated by dotted lines. The telescopes L and L' sweep over arcs $h$ $h'$ of conducting material, with which they make contact. A battery $i$ is connected to the pivot-points A and B. The extremities of the arcs $h$ and $h'$ are connected in Wheatstone-bridge circuit by the wires *a b c d*, with which wires there is connected in loop in the usual way a galvanometer or indicating-instrument *g*. It will be seen that this arrangement of telescopes, arcs, battery, connecting-wire thereto, and the bridge-wires *a b c d* is substantially the same as appears in my aforesaid Letters Patent, Nos. 406,829 and 406,830. Let F be the middle-point of the base-line A B, at which point it may be supposed a gun is located, which is to be directed upon the object T. Draw the dotted lines A X, F Z, and B Y at right angles to the base-line A B. It will be obvious, considering the positions of the two telescopes, as shown, one being at A C and the other at B D, that the azimuth angles are respectively T A X and T B Y. If the telescope L be placed at A E parallel to B D, then the resistance in the branches of the bridge will be equal, and we may assume the galvanometer *g* to show "zero." If the telescope L be then moved back to the position A C, the galvanometer will be deflected and will measure the resistance of the arc E C, from which, in the manner already described in my said prior patents, the distance of the object can be deduced, or, in fact, actually shown on a suitably-graduated galvanometer or other indicating-instrument. In other words, what is here measured is the difference between the angle C A O and E A O, which angle E A O is obviously equal to D B P. Now suppose that the arc *h* be rotated bodily over an angle of one hundred and eighty degrees on O X as an axis. The effect of this turning will be to change the point E over to the point E′, so that the galvanometer will now indicate zero, when the telescopes are respectively in the positions A E′ and B D. Now move the telescope L back to the position A C. Clearly it will have swept over an arc E′ C, and the resistance due to this arc will of course cause a deflection of the galvanometer, which deflection will measure the extent of the arc; but the arc C E′ is equal to the sum of the azimuth angles T B Y and T A X. Consider now the point F, which, as I have said, is located at the middle point of the base-line A B. Here the azimuth angle is T F Z, and this azimuth angle T F Z may be considered as equal to $\frac{TBY+TAX}{2}$. Of course this involves a slight error, due to the confusion of the median line T F of the triangle T A B with a line truly bisecting the angle T; but as in practice the angle T is exceedingly small, probably not more than two or three degrees, the error incident to the assumption above mentioned may be regarded as inconsiderable. It simply remains, therefore, to graduate the indicating instrument so that it will show not the sum of the two angles, but half the sum, which, of course, can be very easily done, and therefore we can read from the galvanometer *g* the azimuth angle of the point F and so obtain the bearing of the object from the point of observation, and hence its position with relation thereto.

Now in practice it will, of course, be difficult and indeed undesirable to rotate the arc *h* in the manner that I have described. I find that I can accomplish the same result by the simple expedient of changing the points of connection of the bridge-wires *a b c d*.

Referring now to Fig. 2, I have shown all the parts which are represented in Fig. 1 in the upper portion of the diagram. I have, however, added an arc of conducting material $h^2$, parallel to the arc *h*, and another arc of conducting material $h^3$, parallel to the arc *h′*, so that each telescope L or L′ sweeps over both arcs simultaneously. Now the wire *c*, it will be noted, is connected to one end of the arc *h*, and its continuation—namely, the wire *d*—is connected to the corresponding end of the arc *h′*. The same thing is true of the wires *a* and *b*. The wire *c′*, however, is connected to one end of the arc $h^2$; but its continuation *d′* is not connected to the corresponding end of the arc $h^3$, but to the opposite end, and the same thing is true of the wires *a′* and *b′*. The wire from the battery *i″* is connected to the telescope in substantially the same way as is the wire from the battery *i*; but the telescopes each carry two contact-springs, one of which—for example, on the telescope L—sweeps over the wire *h* and the other over the wire $h^2$, and these contact-springs are insulated one from the other. The instrument marked *g′* in Fig. 2 is connected in loop with the bridge-wires in the same way as is the instrument *g*. Now the connection of the wires *a′ b′ c′ d′* to the arcs $h^2$ and $h^3$ is obviously different from that of the wires *a b c d* to the arcs *h h′*; but a moment's consideration will show that the effect of this changing of the connections from one arrangement to the other is the same as if the connections had not been touched and one of the arcs had been rotated over an angle of one hundred and eighty degrees in the manner that I have already described. It will be apparent, therefore, that I have here combined in one instrument, first, a device which on the galvanometer *g* will show the distance of the object at which the telescopes L L′ are aimed, and, second, a device which by the indicator *g′* will show the direction or bearing or azimuth angle of that object from the place of observation. I have stated that the galvanometer *g′* may be graduated to show half the sum of the azimuth angles of the telescopes, and in such case the instrument will be one adapted to direct reading from the galvanometer. I may, however, employ the construction shown in Fig. 2 and use a zero method, in which case it is not necessary to have marking on the galvanometer, the apparatus simply working to bring the galvanometer back to zero, and thus giving a scale reading. The construction of this part of the apparatus is substantially similar to that which I have described in Letters Patent No. 406,829.

Between fixed points $m\,n$ and $m'\,n'$ upon a suitable base, extend lengths $o$ and $o'$ of the bridge-wires, and the resistance of each length equals the resistance of one arc $h^2$ or $h^3$. Moving along these wires are sliders $r\,r'$, insulated from one another but connecting, respectively, to the galvanometer $g'$. The carriage $s$, which supports these sliders, has a nut which receives the screw $t$, which is journaled in the base and rotated by the milled head $u$. Upon the base is applied a scale, which may be graduated to show angular bearing, beginning from zero at the middle of the scale and increasing toward either side. As the arrangement of such an apparatus as this is fully explained in my aforesaid prior patent it is not necessary to repeat it here further than to state that the sliders $r\,r'$ are normally adjusted to show zero on the scale, and that when the telescopes are moved so as to produce a given angle one to the other, thereby throwing resistance in the manner already described in the circuit, and so deflecting the galvonometer $g'$, the sliders $r\,r'$ may be moved in one direction or the other to change the relations of the bridge-arms $a'\,b'\,c'\,d'$ until the galvanometer $g'$ is brought back to zero. The extent of movement of the sliders $r\,r'$ is then shown on their scale, from which the angle of bearing may be at once read. For the purpose of clearness in this explanation I have shown the arcs $h\,h^2$ and the arcs $h\,h^3$ as separate, and I have also stated that each telescope L or L' carries two contact-springs. It will, of course, be understood by any electrician that while this construction is perfectly operative and useful it is not a necessary one, because I may use a single arc $h$ or $h'$, having both sets of wires connected to it, in which case, of course, the second battery $i'$ would be unnecessary, the one battery $i$ being sufficient to supply whatever current is necessary.

I claim—

1. The improvement in the art of finding the position of a distant object, which consists in, first, determining a fractional portion of a conducting-body bearing in length a ratio to the azimuth angle of said object, and, second, measuring the electrical resistance of said length.

2. The method of determining the azimuth angle of a distant object, which consists, first, in directing two alidade-arms located at opposite ends of a base-line longitudinally in line with said objects, the said arms establishing and maintaining contact with similar bodies of conducting material, similarly disposed with reference to said base-line, and, second, measuring the sum of the azimuth angles made by said alidade-arms, substantially as described.

3. In a range or position finder, in combination with a source of electricity and an indicating device such as described, two similar bodies of conducting material, similarly disposed with reference to a predetermined base-line, alidade-arms establishing and maintaining electrical contact with said bodies, and circuit connections, as set forth, including a Wheatstone bridge having adjacent members connected to opposite ends of said bodies.

4. In a range or position finder, in combination with a source of electricity and two indicating devices, substantially as described, two similar bodies of conducting material, similarly disposed with reference to a predetermined base-line, alidade-arms establishing and maintaining electrical contact with said bodies, and circuit connections, as set forth, including a Wheatstone bridge having adjacent members, as $d$ and $c$ and $a$ and $b$, connected to corresponding ends of said bodies and to one of said indicating devices, and a second Wheatstone bridge having adjacent members, as $d'$ and $c'$ and $a'$ and $b'$, connected to opposite ends of said bodies and to the second indicating device.

5. The combination, in a range or position finder, of the arcs $h\,h^2$ and $h'\,h^3$, the pivoted telescopes L and L', having contact-pieces relatively insulated one from the other and moving over said arcs $h\,h^2\,h'\,h^3$, the Wheatstone-bridge connections $a\,b\,c\,d$, connected to the arcs $h\,h'$, the indicator $g$ in circuit with said connections, the battery $i$, having its terminals connected to said telescopes L L', the Wheatstone-bridge connections $a'\,b'\,c'\,d'$, connected to said arcs $h^2\,h^3$, the indicator $g'$, connected in circuit with said connections $a'\,b'\,c'\,d'$, and the battery $i'$, having its terminals connected to contact-points respectively on said telescopes L L'.

6. The combination of the arcs $h^2\,h^3$, of conducting material, the pivoted telescopes L L', moving over said arcs, the battery $i'$, communicating with said telescopes, the Wheatstone-bridge connections $a'\,b'\,c'\,d'$, including the fixed conductors $o\,o'$, the sliders $r\,r'$, moving over said wires $o\,o'$ and insulated from one another, and the screw $t$, actuating and adjusting said sliders.

In testimony whereof I have signed my name to this specification in the presence of two subscribing witnesses.

BRADLEY ALLAN FISKE.

Witnesses:
 EDWARD A. WICKES,
 S. O. EDMONDS.